Figure 1:
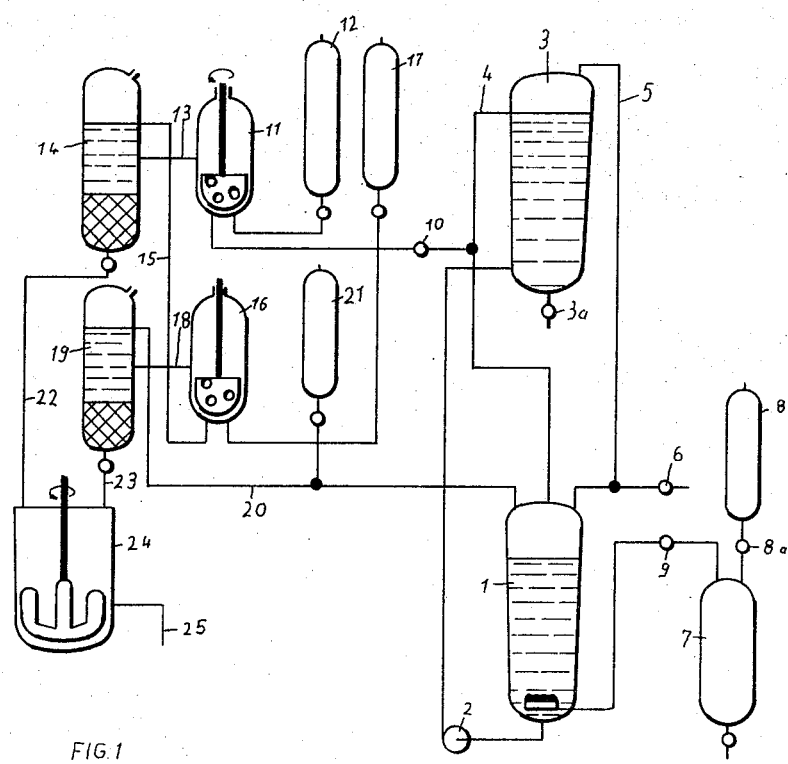

United States Patent
Dorlars

[15] 3,697,597

[45] *Oct. 10, 1972

[54] PROCESS FOR THE PREPARATION OF α-OXIMINOALKYL KETONES

[72] Inventor: Alfons Dorlars, Leverkusen, Germany

[73] Assignee: Farbenfabriken Bayer Aktiengesellschaft, Leverkusen, Germany

[ * ] Notice: The portion of the term of this patent subsequent to Dec. 29, 1987, has been disclaimed.

[22] Filed: Sept. 15, 1969

[21] Appl. No.: 857,970

[30] Foreign Application Priority Data

Sept. 21, 1968 Germany..........P 17 93 468.8

[52] U.S. Cl..............................260/566 A, 260/465 E
[51] Int. Cl..............................................C07c 131/00
[58] Field of Search........................260/566 A, 465 E

[56] References Cited

UNITED STATES PATENTS 2,731,499  1/1956  Coraor...................260/566 A

*Primary Examiner*—Leon Zitver
*Assistant Examiner*—Gerald A. Schwartz
*Attorney*—Burgess, Dinklage & Sprung

[57] ABSTRACT

α-Oximino ketones, for example, oximinodipropyl ketone, are prepared by reacting a ketone in an inert organic solvent immiscible with water in the presence of a hydrogen halide with an amount of alkyl nitrite that is insufficient for complete nitrosation followed by extracting the ketone formed with an aqueous alkali solution, removing the alkaline extract formed and isolating the α-oximino ketone. The ketones formed are useful as intermediates in the synthesis of pharmaceutical compounds, dyes, analytical reagents, plant protection agents, and optical brighteners.

9 Claims, 2 Drawing Figures

PROCESS FOR THE PREPARATION OF α-OXIMINOALKYL KETONES

This invention relates to a process for the preparation of α-oximinoalkyl ketones.

It is known that α-oximino ketones can be obtained in a process first described by Claisen, by reacting the ketones with alkyl nitrites in the presence of acids, hydrogen chloride in particular. See Berichte der Deutschen Chemischen Gesellschaft, Vol. 20 (1887), page 255 and Vol. 22 (1889), page 526: and Organic Reactions, Vol. VII, page 351. In this process, slightly more than the stoichiometric quantity of alkyl nitrite is allowed to act upon the ketone which is to be nitrozated, optionally in a suitable solvent, in the presence of hydrogen chloride used in a quantity differing from instance to instance. The α-oximinoketone formed is removed from the mixture either by extraction with aqueous alkali liquor and precipitation with acid, or by distilling off the solvent, or by precipitation with water (see Houben-Weyl, 4th Edition, Vol. X/4, pages 20 – 25). Unfortunately, this conventional process has disadvantages which give rise to considerable difficulties when it is carried out on a large scale.

One major disadvantage is the usually moderate yields which exceed 60 to 65 percent of the theoretical only in favorable instances. In addition, the purity of the α-oximinoketones obtained, which is inadequate for most applications, usually necessitates an additional after-treatment. This is particularly the case with the conversion of dialkyl ketones into the corresponding α-oximino derivatives, which are obtained in substantially lower yields and purities than the oximino compounds of the aralkyl ketones. Thus, diethyl ketone, for example, is reacted to form oximino diethyl ketone in yields of from 37 to 55 percent in the known embodiment of the Claisen nitrozation (Berichte der Deutschen Chemischen Gesellschaft, Vol. 32 (1889), page 1095), while methyl β-phenylethyl ketone yields 75 percent of 2-oximino-1-phenyl-3-butanone. In addition, the yields are subject to some fluctuation, particularly within the group of dialkyl ketones.

When solvents are used, alcohols are occasionally employed, although the most common solvent is diethyl ether which, although it acts as a weak base allowing the hydrogen chloride effectively to develop its catalytic activity, is not suitable for practical application in view both of its flammability and the accompanying risk of explosions.

The present invention provides a process for the production of α-oximinoketones of the formula $$R'-\underset{\underset{O}{\|}}{C}-\underset{\underset{N-OH}{\|}}{C}-R$$

in which R' represents an alkyl or alkenyl radical which may optionally be substituted by an aryl radical, and R represents hydrogen, an alkyl radical, an alkenyl radical, an aryl radical or an aryl-substituted alkyl or alkenyl radical, or R' represents an optionally substituted aryl radical and R represents an aryl radical or an aryl-substituted alkyl or alkenyl radical, or R' together with R and

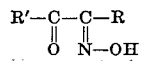

represent a six-membered hydrocarbon ring anellated to an aromatic ring system, which comprises reacting a ketone of the formula

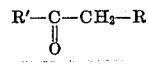

in which R' and R are as defined above, in solution in an inert organic solvent immiscible with water, and in the presence of a hydrogen halide or hydrogen halide donor, with a quantity of an alkyl nitrite insufficient for complete nitrozation, extracting the reaction mixture with an aqueous alkaline reacting solution, and, optionally after the ketone used has been replenished, alternately incompletely nitrozating and extracting the extracted mixture as often as desired, and optionally isolating the α-oximinoketone or its salt from the aqueous-alkaline extracts.

In the above formulas, aryl radicals are preferably phenyl and naphthyl radicals, which may be further substituted. The following are preferred substituents for these aryl radicals: halogen atoms, such as fluorine, chlorine and/or bromine; lower alkyl radicals such as methyl, ethyl, n-propyl, isopropyl, n-butyl, isobutyl, t-butyl and/or amyl; phenyl radicals optionally substituted by fluorine, chlorine, bromine, lower alkyl or alkoxy; lower alkoxy groups such as methoxy, ethoxy, n-propoxy, isopropoxy and/or butoxy; phenoxy groups optionally substituted by fluorine, chlorine, bromine, lower alkyl or alkoxy; nitro groups and cyano groups.

Preferred alkyl radicals include linear or branched alkyl radicals with up to five carbon atoms. Preferred alkenyl radicals include those with from two to five carbon atoms.

If R' and R together with the group

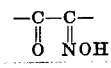

form a six-membered hydrocarbon ring anellated to an aromatic system, ketones of the tetrahydronaphthalene series are preferred.

Examples of ketones in the aforementioned classes include inter alia methyl ethyl ketone, methyl propyl ketone, methyl isobutyl ketone, methyl butyl ketone, methyl hexyl, ketone, methyl undecyl ketone, methyl heptadecyl ketone, methyl benzyl ketone, methyl β-phenylethyl ketone, benzal acetone, p-chloro-, p-methyl-, and p-methoxybenzal acetone, diethyl ketone, ethyl propyl ketone, ethyl isobutyl ketone, dipropyl ketone, dibutyl ketone, styryl ethyl ketone, styryl propyl ketone, 1-phenyl-2-methylpenten-(1)-one-(3), dibenzyl ketone, phenyl benzyl ketone, phenyl-β-phenylethylketone, α-tetralone or β-tetralone.

So far as the reaction of dialkyl ketones with methyl nitrite gas in the presence of hydrogen chloride is concerned, it has been found that in the initial stages the methyl nitrite is almost completely absorbed, although subsequently the absorption rate is increasingly reduced after some of the ketone present has been nitrozated until finally absorption ceases altogether. The supply of more methyl nitrite and hydrogen chloride produces hardly any further increase in yield, but instead reduces the quality of the oximinoketones obtained because they are not inert to the nitrozating agent. The greater part of the methyl nitrite introduced then leaves the reaction mixture unchanged. If, however, both the oximino ketone formed and also the methanol formed from the methyl nitrite consumed are subsequently removed from the mixture by extraction with aqueous-alkaline solutions, nitrozation recommences vigorously, ceasing again after more of the ketone has been converted. It has been found according to the invention, however, that particularly favorable results are obtained by stopping the supply of methyl nitrite before the absorption rate begins to abate, extracting the mixture with aqueous alkali liquor and repeating nitrozation as described above.

While, in the nitrozation of ketones in accordance with embodiments of the Claisen method known from the literature, relatively large quantities of high-boiling and to some extent tarry residue accumulates during workingup of the solvents, the formation of these undesired secondary products is largely suppressed the process according to the invention. Very small quantities of secondary products and side products (e.g. α-chloroketones, hydroxamic acid chlorides and carboxylic acids) are for the most part degraded by the repeated alkaline treatment and/or removed by way of the aqueous phase, so that there is hardly any accumulation of troublesome secondary products. Workingup of the solvents used is only necessary, if at all, after prolonged use or after large-scale reactions. The solvents can readily be worked-up by distillation, and overall the losses of solvent are minimal. Consumed ketone can be periodically replenished.

The oximinoketone formed can be isolated from the aqueous-alkaline extracts either in free form by acidification or in the form of an alkali metal salt by salting out. If desired, the extracts may be used for further reactions without intermediate isolation of the oximinoketone. According to the invention it is possible to economically produce the oximinodialkylketones hitherto only obtained in moderate yields (c.f. Organic Reactions, Vol. VII, Table, pages 358 – 360) and, in part at least, of poor quality, in yields in excess of 85 to 95 percent and in adequate purity by repeated alternate incomplete nitrozation, extraction with aqueous alkali solutions and acidification of the extracts. Quantities of alkyl nitrite that are not sufficient for complete nitrozation are conveniently from 0.1 to 50 mol percent and preferably from 1 to 20mol percent of the theoretically necessary quantity, depending upon the type of ketone to be nitrozated.

Although aralkyl ketones, for example benzyl ketones have hitherto been nitrozated to form purer oximinoketones in substantially better yields than are obtained from dialkyl ketones, the new process according to the invention shows its superiority, even in the nitrozation of ketones such as these, in the production of substantially quantitative yields, in the absence of undesired secondary products, and in the avoidance of expensive solvent regeneration.

Nitrozation and extraction may conveniently be carried out at the same or at different temperatures in the range from −10° to +50°C and preferably at temperatures in the range from +10° to +45°C.

The solvents used in the process according to the invention may belong to a variety of classes, although they must satisfy the following requirements:

1. They must be substantially inert under the reaction conditions;
2. They must show the greatest possible miscibility gap in the system with water or the aqueous-alkaline extraction solutions in the temperature range used;
3. Both the ketone and the oximinoketone must be adequately soluble;
4. The solvent must differ adequately in its density from the aqueous phase, and
5. The partition coefficient of the oximinoketone between the aqueous-alkaline phase and the organic phase must be as high as possible value.

The solvents mentioned below by way of example, may be used either individually or in combination with one another: ethyl n-butyl ether, di-n-propyl ether, diisopropyl ether, di-n-butyl ether, di-sec -butyl ether, di-n-amyl ether, diisoamyl ether, 4,4'-dichloro-di-n-butyl ether, anisole, phenetole, methyl cyclohexyl ether, benzyl methyl ether, benzyl ethyl ether, nitrobenzene, methylene chloride and chloroform.

The alkyl nitrites used in the process according to the invention are preferably derived from the lower alcohols that are readily soluble in water, for example methyl nitrite, ethyl nitrite, n-propyl nitrite or isopropyl nitrite. They are reacted either in the form of liquids or in the form of gases and may be produced either in batches (laboratory scale) or continuously (c.f. Chemie-Ingenieur-Technik, Vol. 25 (1953) page 707.

Hydrogen bromide and aqueous hydrobromic acid, preferably hydrogen chloride or hydrochloric acid, are examples of suitable hydrogen halide or hydrogen halide donors.

Aqueous alkaline-reacting solution, for example aqueous sodium or potassium carbonate solutions, potassium hydroxide solution, and especially sodium hydroxide solution are used for extracting the oximinoketone, the "alkali" concentration preferably being in the range from 0.5 to 5 normal. In order to adjust the difference in density and to improve the phase separation, substances of the kind normally used, for example neutral salts such as sodium chloride or sodium sulphate, may be added to the "alkali" solution. A single distribution between the phases is generally sufficient for extracting the oximinoketones. In the case of the higher oximinoalkylketones, repeated extractions may be an advantage on account of their less favorable distribution coefficients, being carried out on the lines of multiplicative distribution in order more effectively to utilize the aqueous alkali solution.

The advantages of the process according to the invention, as pointed out above, namely the high reaction velocity, the high stoichiometric yield and pure products, the absence of secondary products from the reaction mixture and hence the lack of any necessity to regenerate the solvents, the use during nitrozation of only small quantities of hydrogen chloride which can be taken from aqueous hydrochloric acid, and the absence of any strongly acidic effluents, make it particularly suitable for continuous working, giving high volume-time yields.

In order to minimize the losses of ketone during the reaction of lower dialkyl ketones whose solubility in aqueous media, aqueous acids in particular, is too high to be disregarded, the extent of the nitrozation reaction will be made as high as possible and the volume of the alkaline extraction solution as low as possible in continuous operation, while on the other hand gaseous hydrogen halide will be used in order to charge the organic phase with hydrogen halide, or when aqueous hydrohalic acids are used as hydrogen halide donors, every effort should be made to manage with the smallest possible quantities.

The α-oximinoketones that can be obtained by the process according to the invention are valuable intermediates for the synthesis of pharmaceutical preparations, dyes, analytical reagents, plant-protection agents and optical brighteners (see French Patent specification No. 1,480,699). The other compounds that can be obtained by the process according to the invention may be used in the same way as described in the French Patent Specification.

EXAMPLE 1

Di-n-propyl ketone is nitrozated in batches in the following apparatus:

1. Reaction flask: 4-liter capacity four-necked flask equipped with gas inlet stirrer, gas-inlet frit for hydrogen chloride, thermometer, reflux condenser with bubble counter and discharge cock at its bottom.
2. Methyl nitrite generator: 2-liter capacity four-necked flask equipped with stirring mechanism, thermometer, graduated 500 ml dropping funnel and reflux condenser with bubble counter, which is connected to the gas inlet of the reaction flask.

The flask of the methyl nitrite generator is filled with 360 g. (5.2 mols) of sodium nitrite, 400 ml. of water and 235 ml. (186 g = 5.8 mols) of methanol. The dropping funnel is filled with 500 ml of 10 n-sulphuric acid. This filling is replenished each time 5 mols of methyl nitrite are consumed (100 ml. of 10 n-sulphuric acid correspond approximately to 1 mol of methyl nitrite).

1.4 liters of di-n-butyl ether and 685 g (6.0 mol) of di-n-propyl ketone are introduced into the reaction flask. The addition of 10 ml. of concentrated hydrochloric acid is followed by the introduction of methyl nitrite gas which is developed by the gradual dropwise addition of the 10 n-sulphuric acid to the aqueous-methanolic nitrite solution. The methyl nitrite introduced is quickly absorbed. The output bubble counter on the reflux condenser of the reaction flask remains inoperative. Following the absorption of 1.0 mol of methyl nitrite, the introduction of the nitrite is interrupted and the reaction mixture is stirred for 10 to 15 minutes. During nitrozation, the temperature rises from about 20° to 32°C.

600 ml. of ice cold 2 n-sodium hydroxide solution are run into the mixture with rapid stirring through the thermometer connection. The contents of the flask are then vigorously stirred for about 2 minutes and then left to settle after the stirring mechanism has been switched off. The heavy yellowish-brown aqueous-alkaline layer is quickly and completely separated from the almost colorless light organic phase. The alkaline extract is run off through the bottom valve. The organic solution left in the flask, which has returned to room temperature, is re-acidified with 10 ml. of concentrated hydrochloric acid and treated while stirring with 0.9 mol of methyl nitrite gas which is almost entirely absorbed. The temperature rises to 30.5°C. This is followed by brief stirring and then by extraction with 540 ml of ice-cold 2 n-sodium hydroxide solution in the manner described above.

Nitrozation and alkaline extraction are initially carried out five times in succession. The aqueous-alkaline extracts are each weakly acidified while cooling with concentrated hydrochloric acid, the oximino dipropyl ketone being precipitated in the form of a light oil which after standing for a while is separated off and washed with a little ice water. It still contains 11 percent by weight of water and solvent which can be removed by vacuum distillation. The nitrite consumption, the quantity of 2 n-sodium hydroxide solution required for each extraction and the yield of oximinoketone are set out in the following Table. After the fifth run, consumed ketone is replaced by the addition of 365 g (3.2 mols) of dipropyl ketone to the reaction mixture. This is followed by nitrozation in the presence of hydrochloric acid and extraction with 2 n-sodium hydroxide solution, each being repeated five times in the manner described (runs six to 10).

TABLE

| Run | Methyl nitrite consumed | Sodium hydroxide consumed | Yield of 89% oximinoketone |
|---|---|---|---|
| 1 | 1.0 mol | 600 ml | 143 g = 0.89 mol |
| 2 | 0.9 mol | 540 ml | 131 g = 0.81 mol |
| 3 | 0.8 mol | 480 ml | 104 g = 0.65 mol |
| 4 | 0.7 mol | 420 ml | 85 g = 0.53 mol |
| 5 | 0.6 mol | 360 ml | 52 g = 0.32 mol |
| 6 | 1.0 mol | 600 ml | 147 g = 0.92 mol |
| 7 | 0.9 mol | 540 ml | 129 g = 0.80 mol |
| 8 | 0.8 mol | 480 ml | 96 g = 0.60 mol |
| 9 | 0.7 mol | 420 ml | 90 g = 0.56 mol |
| 10 | 0.6 mol | 360 ml | 48 g = 0.29 mol |
| Total | 8.0 mol | 4800 ml | 1026 g of 89% product corresponds to 912 g of pure product = 6.37 mols |

In order to determine the yield, the test is suspended after the 10th run. Any dipropyl ketone still present in the organic layer left is detected by analysis: found 230 g = 2.0 mols.

Consumption of dipropyl ketone: 6.0 + 3.2 − 2.0 mols = 7.2 mols

Yield of oximinodipropyl ketone: 912 g = 6.37 mol (88.5 percent of the theoretical)

The oximinodipropyl ketone obtained can be completely freed from any water and solvents adhering to it by vacuum distillation. b.p.$_{0.2}$: 72° − 74°C; colorless oil which crystallizes on standing in the cold.

Similarly favorable results are obtained by the nitrozation of styryl ethyl ketone into styryl oximinoethyl ketone, F. 143° − 145°, which can be carried out under the same reaction conditions and in an analogous manner.

EXAMPLE 2

Methyl benzene ketone is continuously nitrozated in the apparatus diagrammatically illustrated in FIG. 4 of the accompanying Drawings:

1. Reaction part: The reactor (1) is a cylindrical vessel of approximately 5 liters capacity equipped with thermometer and feed inlet which is connected through a pump (2) with a levelling vessel (3) of approximately 3 liters capacity situated at a higher level. The levelling vessel is equipped with a discharge cock (3a). The upper part of (3) is connected through a pipe (5) with the upper part of (1) and, through an output bubble counter (6), with the atmosphere. An overflow tube (4) enables liquid to flow back from (3) to (1).

A methyl nitrite generator (7) is a three-liter flask equipped with stirring mechanism, thermometer, graduated 1-liter dropping funnel, discharge cock and gas outlet pipe which is connected through an input bubble counter (9) to the frit of (1).

2. Extraction part: A first mixer (11), a cylindrical agitation vessel of approximately 600 ml capacity equipped with high-speed stirring mechanism which communicates through tubes at its lower end both with a graduated dropping funnel (12) and also through a valve (10) with a descending pipe (4), is connected through a tube (13) to a first settling chamber (14), from which two separated phases are able to flow off through a tube provided for each. The tube for the lighter phase (15) leads to a second mixer (16) which is connected with a graduated 2-liter dropping funnel (17) and in all other respects corresponds to the first mixer (11). The heavy phase is passed through a pipe (22) into a precipitation vessel (24) which is equipped with a stirrer and a wide discharge pipe (25). The second mixer (16) communicates through (18) with a second settling chamber (19) which is identical in its dimensions with the first settling chamber (14). The light phase flows from (19) through a pipe (20) and a following separator back into the reactor (1). The pipe (20) is connected to a graduated 1-liter dropping funnel (21). A pipe (23) for the heavy phase also leads into the precipitation vessel (24). 736 g. (10.6 mols) of sodium nitrite, 800 ml of water and 520 ml (412 g = 12.8 mols) of methanol are introduced into the methyl nitrite generator (7), and the dropping funnel (8) is filled with 1 liter of 10 n-sulphuric acid. The entire filling of (7) and (8) is renewed after each consumption.

A mixture of 5.85 liters of di-sec-butyl ether, 2.15 liters (2.15 kg = 16.0 mols) of methyl benzyl ketone and 20 ml of hydrochloric acid of $d = 1.9$ g/cc. is introduced at room temperature into the reactor (1). The pump (2) functions at the same time so that the levelling vessel (3) is also filled, the solution flows back through (4) to (3) and the circuit between (1) and (3) remains permanently in operation. 2 liters of 2n-sodium hydroxide solution are introduced into the dropping funnel (12), 2 liters of hydrochloric acid of $d = 1.16$ g/cc. (31.5 percent by weight of hydrogen chloride) are introduced into the dropping funnel (17) and 1 liter of methyl benzyl ketone is introduced into the supply funnel (21). 10 n-sulphuric acid is added dropwise to the flask (7) from (8) with stirring. Methyl nitrite is immediately developed, entering the acid ketone solution at (1) through the frit. While the input counter (9) operates quickly, the output counter (6) remains completely at rest.

After about 2 mols of methyl nitrite have been introduced (100 ml of 10 n-sulphuric acid correspond to 1 mol of methyl nitrite), continuous extraction is commenced. For this purpose, the stirring mechanisms of the mixers (11) and (16) are initially started up, 2 n-sodium hydroxide and and hydrochloric acid being run into the mixers (11) and (16) from (12) and (17) respectively. Finally, the valve (10) is opened, through which the organic reaction solution partly enters (11), where it is thoroughly mixed with the sodium hydroxide solution. The oximinobenzylmethyl ketone formed passes almost quantitatively from the organic phase in the form of the sodium salt into the aqueous phase, which also washes out the methanol formed from the methyl nitrite. Small quantities of chlorinated and oxidized secondary products are degraded or dissolved out of the organic phase by the alkali treatment in (11). The hydrogen chloride dissolved in the organic phase is also inevitably removed so that it has to be re-added in a subsequent stage. This is done in the mixer (16). Initially, the mixture is accelerated from (11) through the pipe (13) into the settling chamber (14) where the two phases are quickly separated and flow off through (22) and (15), respectively.

The quantity of sodium hydroxide to be removed from (12) is regulated with the valve (10) open in such a way that the orange-brown-colored aqueous solution of the sodium oximinobenzyl methyl ketone flowing off from the chamber (14) through (22) has a pH value of from 12.4 to 13.2

The extracted organic solution discharged through (15) is recharged with hydrogen chloride in the mixer (16) by the hydrochloric acid coming from (17). Following phase separation in the chamber (19), the light organic phase flows back through (20) to (1). On its way there, consumed starting material is replaced by the dropwise addition of methyl benzyl ketone from the supply vessel (21), the rate of addition being adjusted in dependence upon the yield of oximinobenzyl methyl ketone per unit of time.

The heavy, aqueous hydrochloric acid layer flows out of (19) through the pipe (23) into the precipitation vessel (24), into which the alkaline solution of the sodium oximinobenzyl methyl ketone also flows with stirring from a chamber (14) through the pipe (22). The quantity of hydrochloric acid introduced dropwise through (23) is adjusted at the valve of the dropping funnel (17) in such a way that the pasty-crystalline suspension of the free oximinobenzyl methyl ketone formed in (24) has a pH-value of from 3.0 to 3.5. This crystal paste or sludge is continuously run off through the wide discharge pipe (25), collected on a suction filter, washed with a little cold water, filtered dry and then dried in an air-circulation drying cabinet at 65°C.

After a short operating period, a substantially constant concentration of the oximinobenzyl methyl ketone is adjusted in the solution circulating through (1) and (3), providing the rate at which the methyl nitrite is supplied (adjustment at 8a) on the one hand, and the rate at which the oximinobenzyl methyl ketone formed is run off (adjustment at 10), are suitably adapted to one another. Since the settings at (12), (17) and (21) governed by the position of the valve (10) are easy to find, constant conditions soon prevail in the apparatus. During operation, the reaction temperature is kept in the range from 30° to 33°C. The nitrozation velocity is so high that no more methyl nitrite can be detected in the solution as it enters the mixer (11). The reaction mixture in (1) always contains an adequate quantity of hydrogen chloride.

In order to determine the yield, the installation is brought to a standstill after operation for 52 hours. All the solutions are run off and worked up.
Consumption of:

| | | |
|---|---|---|
| 1. Methyl nitrite | | 199.0 mols |
| 2. Methyl benzyl ketone: | Quantity initially introduced | 1.44 kg |
| | Quantity added | + 19.96 kg |
| | | 21.67 kg |
| | Quantity recovered after interruption | − 1.21 kg |
| | Quantity reacted | 20.46 kg = 184.0 mols |

Pale cream-colored oximinobenzyl methyl ketone is obtained in a yield of 23.60 kg or 176.0 mols.
m.p. 161° − 163°C.
Yield: 95.5 percent of the theoretical, based on the methyl benzyl ketone reacted.
Utilization of the methyl nitrite: 88.5 percent

EXAMPLE 3

Di-n-propyl ketone is continuously nitrozated under the following conditions in the apparatus described in Example 2, to which a separating chamber is connected through the discharge pipe (25). The circulating organic phase consists of 8 liters of a solution of dipropyl-ketone (3 mols of ketone per liter of solution) in di-sec-butyl ether. The nitrozation rate is 2.5 to 3.0 mols of methyl nitrite per hour and the reaction temperature is kept in the range from 28° to 34°C. 4 n-sodium hydroxide solution is used for extraction. The precipitation vessel (24) is cooled from the outside. The oximinodipropyl ketone formed accumulates in the separating chamber connected to (25), flowing off into a collecting vessel in the form of the lighter pale layer. A small quantity of water and solvent, which is of no significance as far as further reactions are concerned, may be removed if desired by vacuum distillation (b.p. 0.2 = 72° − 74°C). A total of 17.12 kg (150.0 mols) of dipropyl ketone are reacted over a period of some 56 hours. Oximino dipropyl ketone is obtained in a yield of 19.50 kg. (136.1 mol, 90.9 percent of the theoretical). Utilization of the nitrite amounts to 88.0 percent.

EXAMPLE 4

Figure 2:
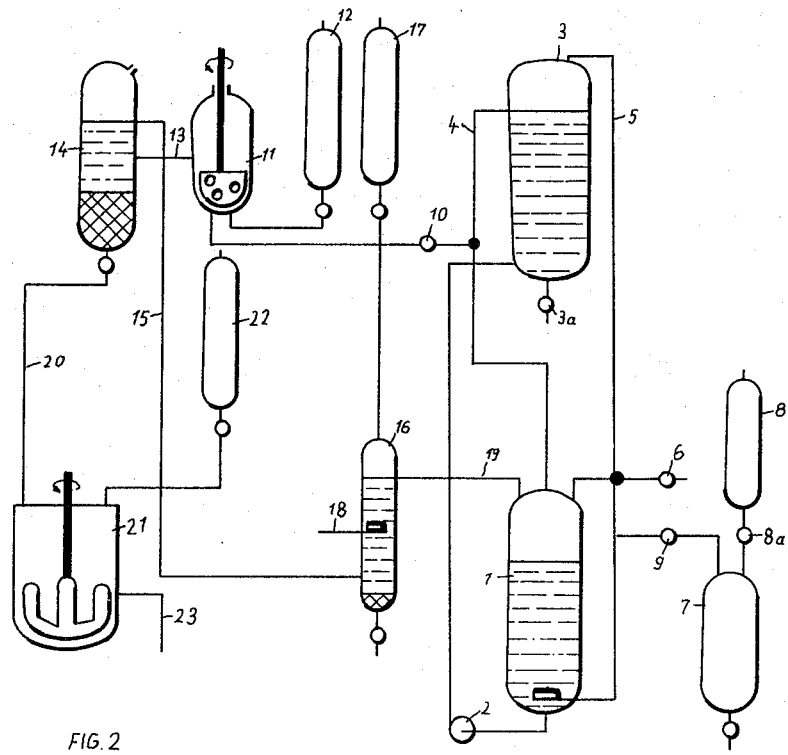

Diethyl ketone is continuously nitrozated in the apparatus diagrammatically illustrated in FIG. 2.

1. The reaction part with the reactor circuit and the methyl nitrite generator (1 to 9) is the same as the apparatus described in Example 2.

2. Unlike the apparatus diagrammatically illustrated in FIG. 1, the extraction par contains only one mixing and separating unit (10 to 14; identical with the components of similar reference in FIG. 1). The lighter phase flows from the settling chamber (14) through a pipe (15) into an after-separator (16) which is provided with a gasification frit and is connected to a supply vessel (17). The light phase flows back to reactor (1) from (16) through a pipe (19).

The heavier phase flows from (14) through a pipe (20) into a cooled precipitation vessel (21), into which the contents of a supply vessel (22) can be added dropwise.

The methyl nitrite generator (7 and 8) is filled as already described. A mixture of 5.45 liters of di-sec-butyl ether, 2.55 liters (2.07 kg = 24 mols) diethyl ketone and 20 ml of hydrochloric acid of $d = 1.19$ g/cc. is introduced into the reactor (1) so that a circuit is maintained between (1) and (3) while the pump (2) is operating. 4 n-sodium hydroxide solution is introduced into the supply vessel (12), while hydrochloric acid of $d = 1.19$ g/cc. and diethyl ketone are introduced into the vessels (22) and (17), respectively. Methyl nitrite is delivered from (7) into (1) at a rate of 4.0 to 4.5 mols per hour and, after approximately 3.0 to 3.5 mols of methyl nitrite have been absorbed, extraction of the oximinodiethyl ketone with 4 n-sodium hydroxide solution in (11) is commenced as described in Example 2. The quantity of sodium hydroxide to be removed through (12) is regulated in dependence upon the pH-value of the solution of the sodium oximinodiethyl ketone formed which flows off from (14) through (20), which should be between 12.8 and 13.2. The extracted organic solution flowing off through (15), has small quantities of aqueous phase removed from it in the after-separator (16), and is charged through (18) with catalytic quantities of hydrogen chloride gas. After the amount of ketone consumed has been replaced, it flows back to (1) through (19) from the supply vessel (17).

The orange-brown aqueous-alkaline solution of the sodium oximinodiethyl ketone delivered to the precipitation vessel (21) through (20), has hydrochloric acid added to it from (22) with stirring and cooling at 0° to +5°C so long as the pH-value of the pasty-crystalline suspension of the free oximino diethyl-ketone formed remains in the range from 3.0 to 2.8, which is readily obtained by an automatic supply of hydrochloric acid regulated by the pH-value. The crystal sludge discharged through the wide pipe (23) is collected on a suction filter, is finally washed with a little cold dilute sodium chloride solution and filtered dry. Cream-colored almost white crystalline oximinodiethyl ketone is obtained. It still contains 5 to 6 percent by weight of water and 2 to 2.5 percent by weight sodium chloride, is almost entirely free from organic impurities and may be used without further purification for condensation reactions.

During operation of the installation under constant conditions, a reaction temperature of from 28° to 33°C is maintained by means of cooling coils (not shown) installed in (1) and (3). No more unconsumed methyl nitrite can be detected in the organic solution as it enters (11) so that no nitrous gases are liberated in (21). In order to determine the yield, operation is interrupted after 95 hours. All the solutions are worked up and analyzed.
Consumption of

| | | |
|---|---|---|
| 1. Methyl nitrite = | | 406 mols |
| 2. Diethyl ketone = | Quantity initially introduced | 20.7 kg |
| | Quantity added | 33.28 kg |
| | | 35.35 kg |
| | Quantity recovered after interruption | − 1.64 kg |
| | Quantity reacted 33.71 kg = | 391.5 mols |

44.4 kg of 92 percent corresponding to 40.8 kg of 100 percent oximinodiethyl ketone (= 354.5 mols) melting at 59° to 60°C are obtained.

Yield: 90.6 percent of the theoretical, based on diethyl ketone reacted.

Utilization of the methyl nitrite: nitrozation percent

Similar results are obtained in the nitrosation of methyl isobutyl ketone into 4-methyl-3-oximino-2-pentanone which may be similarly carried out under the same reaction conditions.

What we claim is:

1. Process for the preparation of α-oximinoketones having the formula:

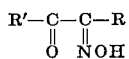

wherein
R' is a radical selected from the group consisting of $C_1$—$C_5$ alkyl, $C_2$—$C_5$ alkenyl, $C_6$—$C_{10}$ aryl substituted $C_1$—$C_5$ alkyl, $C_6$—$C_{10}$ aryl substituted $C_2$—$C_5$ alkenyl and $C_6$—$C_{10}$ aryl, the foregoing aryls being unsubstituted or substituted with a substituent selected from the group consisting of halogen, lower alkyl, phenyl, phenyl substituted by halogen, lower alkyl or lower alkoxy, lower alkoxy, phenoxy, phenoxy substituted by halogen, lower alkyl or lower alkoxy, nitro and cyano;
R is hydrogen or the same as defined for R'; or
R' and R may be joined together to form, with the —CO—CNOH— group, a six-membered hydrocarbon ring annellated to an aromatic ring system with the proviso that when R' is aryl, R is an aryl or aryl substituted alkyl or alkenyl radical, which comprises the steps of
A. nitrozating
  1. a ketone having the formula

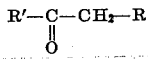

wherein R' and R are as previously defined, by adding thereto
  2. from 0.1 to 50 mol per cent of an alkyl nitrite which amount is insufficient for complete nitrozation, in the presence of
  3. a compound selected from the group consisting of hydrogen halide and hydrogen halide donors, in an inert organic solvent immiscible with water;
B. terminating the addition of alkyl nitrite before the initial rate of absorption of the alkyl nitrite begins to abate;
C. extracting the α-oximinoketone formed with an aqueous alkaline solution;
D. removing the aqueous alkaline extract formed in step (C) from the reaction mixture; and
E. again nitrozating said ketone with said alkyl nitrite as in step (A) and thereafter repeating steps (B), (C) and (D).

2. Process of claim 1 wherein consumed ketone is replenished.

3. Process of claim 1 wherein the nitrozation reaction is carried out continuously by alternately repeating steps (A), (B), (C) and (D) and periodically replenishing the ketone consumed.

4. Process of claim 1 wherein the α-oximinoketone formed is isolated from said aqueous alkaline extract.

5. A process as claimed in claim 1 wherein the quantity of alkyl nitrite is from 1 to 20 mol percent of the theoretically necessary quantity.

6. A process as claimed in claim 1 wherein nitrozation and extraction are carried out at the same or at different temperatures in the range from −10° to +50°C.

7. A process as claimed in claim 1 wherein the alkyl nitrite is methyl nitrite, ethyl nitrite, n-propyl nitrite or isopropyl nitrite.

8. A process as claimed in claim 1 wherein the hydrogen halide or hydrogen halide donor is hydrogen bromide, aqueous hydrobromic acid, hydrogen chloride or aqueous hydrochloric acid.

9. A process as claimed in claim 1 wherein the ketone is selected from the group consisting of methyl ethyl ketone, methyl propyl ketone, methyl isobutyl ketone, methyl butyl ketone, methyl hexyl ketone, methyl undecyl ketone, methyl heptadecyl ketone, methyl benzyl ketone, methyl β-phenylethyl ketone, benzal acetone, p-chloro-, p-methyl-, and p-methoxybenzal acetone, diethyl ketone, ethyl propyl ketone, ethyl isobutyl ketone, dipropyl ketone, dibutyl ketone, styryl ethyl ketone, styryl propyl ketone, 1-phenyl-2-methylpenten-(1)-one(3), dibenzyl ketone, phenyl benzyl ketone, phenyl-β-phenylethylketone, and α-tetralone or β-tetralone.

* * * * *

UNITED STATES PATENT OFFICE
CERTIFICATE OF CORRECTION

Patent No. 3,697,597         Dated  Oct. 10, 1972

Inventor(s)  ALFONS DORLARS

It is certified that error appears in the above-identified patent and that said Letters Patent are hereby corrected as shown below:

Front page, right hand column, after the listing of United States Patents, insert the following:

--Other References

Slater, J. Chem. Soc. (London) 117,587-591 (1920)
Adams, Organic Reactions, vol. VII, (1963) Chapter 6,
    page 330 --

Column 6, line 34, in the Table under the heading "Yield etc." "Run 6", "147 g" should be --148 g--

Column 10, line 61, "20.7 kg" should be --2.07 kg--

Column 11, line 6, "nitrozation percent" should be --87.1%--

Signed and sealed this 19th day of February 1974.

(SEAL)
Attest:

EDWARD M. FLETCHER, JR.            C. MARSHALL DANN
Attesting Officer                  Commissioner of Patents